Patented Aug. 21, 1923.

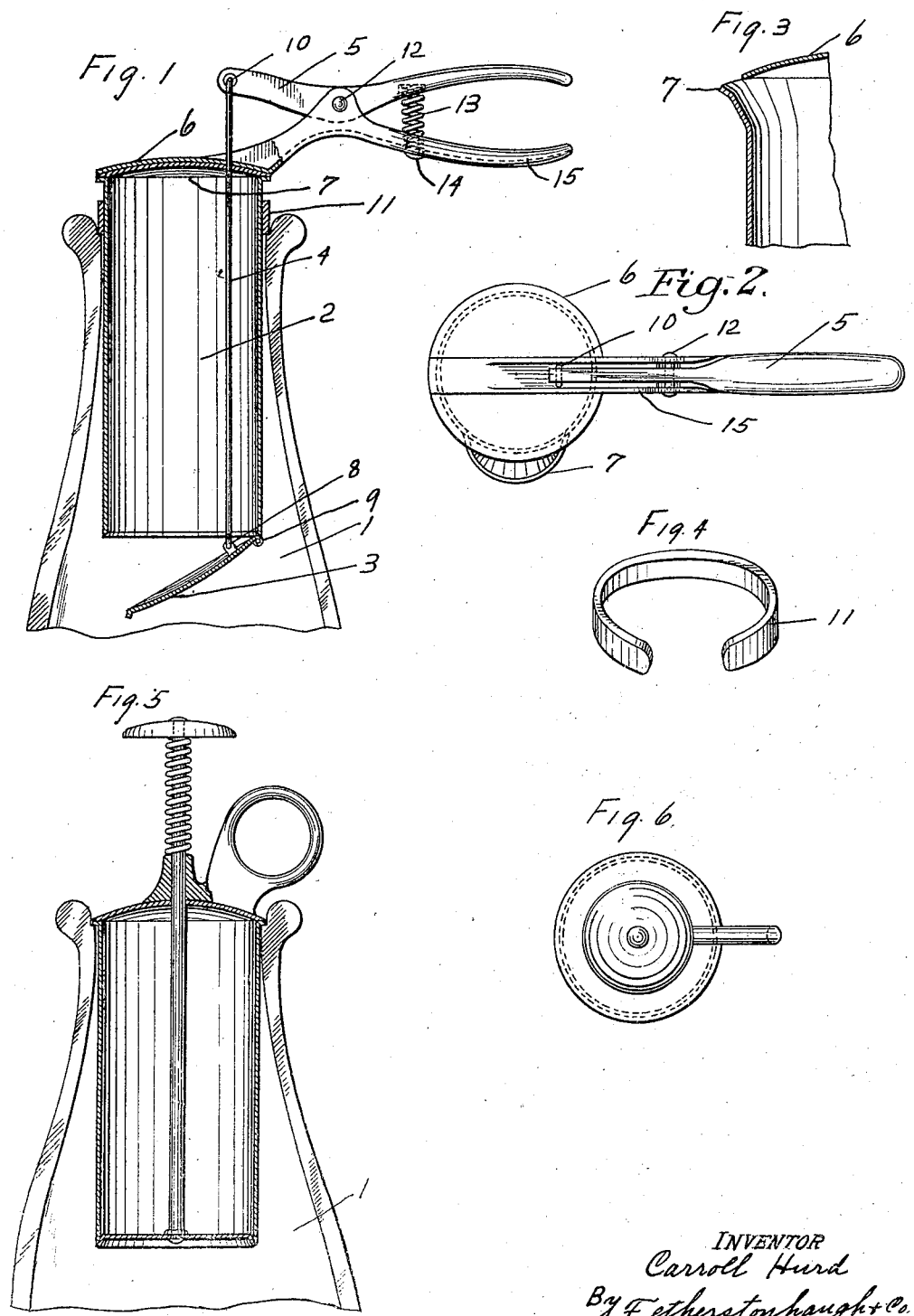

1,465,825

UNITED STATES PATENT OFFICE.

CARROLL HURD, OF CLEVELAND, OHIO.

LIQUID EXTRACTOR.

Application filed January 10, 1922. Serial No. 528,232.

*To all whom it may concern:*

Be it known that I, CARROLL HURD, a citizen of the United States, residing at Cleveland, in the county of Cuyahoga and State of Ohio, and whose post-office address is 1251 East 87th Street, have invented certain new and useful Improvements in Liquid Extractors, of which the following is a specification.

My invention relates to improvements in liquid extractors and is principally adaptable for extracting the cream or top milk off from milk bottles.

The object of the invention is to devise an article of manufacture which will the more easily remove the cream or top milk from an ordinary milk bottle with less disturbance of the contents than heretofore and at the same time be more useful and efficient.

My invention consists of a cylindrical casing made preferably of some light metal or other suitable material, a bottom suitable hinged to the bottom of the casing, a suitable lever handle located at the top of the casing, a rod connecting the bottom to the lever, spring means in the handle for keeping the bottom lid in open position, and a yoke or band surrounding the casing and designed to adjust the height of the casing in the bottle, all as hereinafter more particularly explained.

Figure 1 is a sectional view of my device constructed according to my invention.

Figure 2 is a plan view, showing the spout.

Figure 3 is a broken section of the side elevation through the line 3—3 of Figure 2.

Figure 4 is a perspective view of the friction band for holding the casing to any desired height.

Fig. 5 is a sectional view similar to Fig. 1, showing a modification of the invention; and Fig. 6 is a plan view of the modification shown in Fig. 5.

1 is an ordinary milk bottle. 2 is a hollow casing. 3 is a lid suitably hinged at the bottom for movement downward. 4 is a rod suitably connected to the lid 3 and to the lever 5 at the top. 6 is the top cover for the support of the stationary handle 15. 7 is the spout which may be used for pouring if desired. 8 is a rivet or loose connecting means of the rod to the bottom lid 3. 9 is the hinge for the bottom lid 3. 10 is the connection of the rod to the lever. 11 is the frictional band for holding the casing at the desired height. 12 is the fulcrum. 13 is the spring means for holding the gripping portion of the lever handle apart. 14 is a bolt or rivet for holding the spring in place. 15 is the stationary handle or gripping portion.

Now as the device is inserted in the bottle with the bottom open, it cuts its way through the liquid without disturbing the top milk, and by pressure on the top lever through a slight gripping pressure of the hand, the bottom lid is closed and the top milk retained in the casing and can be lifted out of the bottle and either poured out of the casing by the spout or the bottom lid can be opened slightly to allow same to run out in the desired quantity. The frictional band, it will be seen, can be used to regulate the extent of the insertion of the casing into the bottle according to the depth and height of the cream.

While the above figures show my device as a preferred construction, the same effective manner of accomplishing the work may be done by the device constructed according to Figures 5 and 6 and it is not desired to limit myself to the construction as shown in the first four figures but it may be made according to the construction as shown in Figures 5 and 6.

What I claim as my invention is:

A cream remover for insertion in a milk bottle comprising a receiver closed at its upper end and open at the lower end, a closure hinged to the said lower end of the receiver, a rod connected to the closure at a point adjacent to the hinge and passing slidably through an opening in the upper end wall, a laterally extending handle having its inner end rigidly secured on the upper closed end of the receiver and apertured to form a bearing receiving the rod therethrough, a lever connected at its inner end to the upper extremity of the rod and pivoted at an intermediate portion thereof to a corresponding portion of the said handle, and a spring interposed between the handle and the lever outwardly of the pivot and normally acting through the lever and rod to hold the closure in an open position.

In testimony whereof I affix my signature.

CARROLL HURD.